(12) United States Patent
Ahrweiler

(10) Patent No.: US 6,305,421 B1
(45) Date of Patent: Oct. 23, 2001

(54) TUBULAR ELEMENT AND DEVICE EQUIPPED THEREWITH FOR APPLYING A FLUID PROCESSING AGENT TO A STRIP OF FABRIC

(75) Inventor: Karl-Heinz Ahrweiler, Willich (DE)

(73) Assignee: Eduard Kusters MaschinenFabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/445,309

(22) Filed: Mar. 24, 2000

(30) Foreign Application Priority Data

Jun. 6, 1997 (DE) .............................. 197 23 802

(51) Int. Cl.⁷ .................................................. F16L 55/04
(52) U.S. Cl. ................... 138/30; 138/31; 118/50
(58) Field of Search ................... 138/30, 31, 24; 118/50

(56) References Cited

U.S. PATENT DOCUMENTS

| 2,448,118 | 8/1948 | Pellettere . | |
|---|---|---|---|
| 2,609,001 | 9/1952 | Hebard . | |
| 3,103,234 | 9/1963 | Washburn . | |
| 3,744,527 | * 7/1973 | Mercier | 138/30 |
| 3,948,287 | * 4/1976 | Sugimura et al. | 138/30 |
| 4,628,964 | * 12/1986 | Sugimura et al. | 138/30 |
| 4,759,387 | * 7/1988 | Arendt | 138/30 |

FOREIGN PATENT DOCUMENTS

| 1 096 694 | 1/1961 | (DE) . |
|---|---|---|
| 29 00 712 | 7/1980 | (DE) . |
| 33 15 770 | 10/1984 | (DE) . |
| 40 31 228 | 4/1992 | (DE) . |
| 197 05 258 | 8/1998 | (DE) . |

* cited by examiner

Primary Examiner—Patrick Brinson

(57) ABSTRACT

A tubular element (100) which is inserted into a liquid-conducting conduit (10) includes an annular chamber (25) that is delimited radially towards the inside by a tubing section (30) made of a material with an elastically flexible surface. The tubular element (100) serves as a flexible damping conduit section, or, if the annular chamber (25) is connected with a partial vacuum chamber at a connector (21), and the tubing section (30) is inflated into the annular chamber (25), as a means for temporarily holding an amount of liquid, for example in order to withdraw a dye bath from the exit slit of an application device for dyeing textile webs.

6 Claims, 4 Drawing Sheets

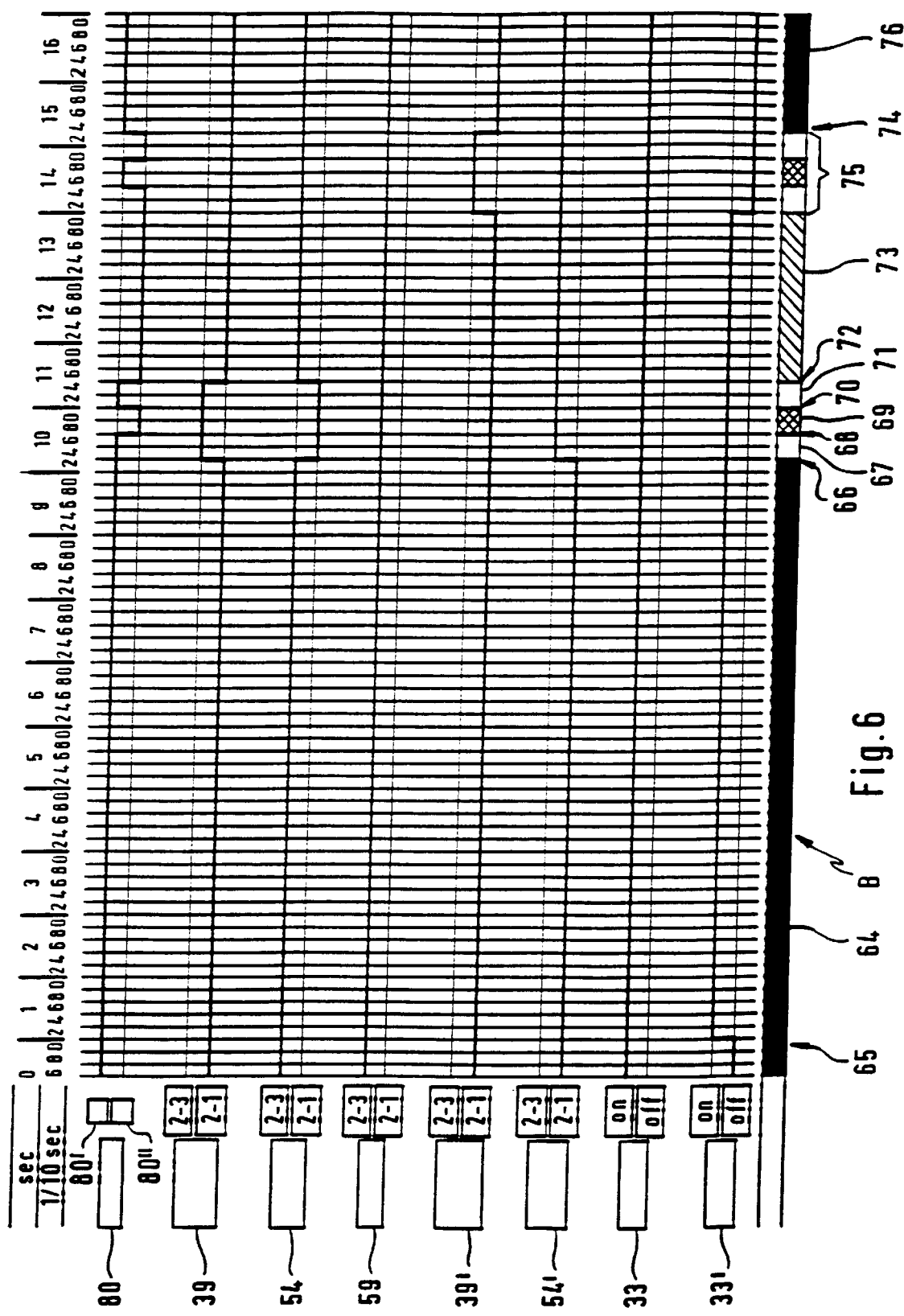

TUBULAR ELEMENT AND DEVICE EQUIPPED THEREWITH FOR APPLYING A FLUID PROCESSING AGENT TO A STRIP OF FABRIC

FIELD OF THE INVENTION

The invention relates to a deviced for applying a fluid processing agent to a strip of fabric.

BACKGROUND INFORMATION

It is known to affix a so-called pressure accumulator in liquid-conducting conduits, to absorb and damp pressure variations and pressure surges in them, where this accumulator is connected with the conduit via a shunt line. This arrangement works well, as long as only one and the same liquid flows in the conduit. However, if a change in liquid occurs during operation, the residual amount of advancing liquid remaining in the shunt line and on the one side of the accumulator can prove to be disruptive. The residual liquid gradually mixes with the next liquid and contaminates the latter. This problem is particularly obvious in feed lines to application heads that carry fluid processing agents in the form of dye baths. Corresponding systems are known, for example, from German Patent A1 29 00 712 and German Patent A1 33 15 770 A1. If, for example, red dye was being used first, and a switch to yellow takes place, the residual amount of "dead" red dye remaining in the shunt line and on the one side of the accumulator will gradually mix with the yellow and turn it orange.

SUMMARY OF THE INVENTION

The present invention is based on the task of creating an arrangement to influence the amount of liquid flowing through a feed line to an application head, in which the smallest possible residual amount can be expected when the liquid is changed.

This task is accomplished by providing a pressure accumulator in the feed line between a fluid processing agent source and an application head. The pressure accumulator has an elastic sleeve which is substantially the same diameter as the feed line. The elastic sleeve is fastened to a tubular housing, and the housing is sized so that there is an annular chamber formed between the housing and the elastic sleeve. The annular chamber has a connector which allows the annular chamber to be in fluid connection with either a pressure source or a vacuum source.

The "tubular element" is actually known, as a cuff valve, from German Patent 40 31 228 A1, in the more relevant function as a pressure surge damper from German Patent 10 96 694 B. It exercises practically the same function as the pressure accumulator that has already been mentioned. Here, the "pressure accumulator" surrounds the conduit, so to speak, and continues its inside circumference practically in the same alignment, without any shunt line or similar areas that must be filled with liquid being required in order for the "pressure accumulator" to fulfill its function.

The pressure accumulator can function in two modes.

In the first mode, if a pressure is maintained at the connection that corresponds to the pressure in the flowing liquid, the tubing section remains essentially cylindrical and merely continues the conduit at practically the same diameter. In this state, the tubular element can serve as a damping element, in that the elastically flexible tubing section moves back somewhat in case of a pressure surge and absorbs the pressure surge.

The mode imparts an active influence on the flow of the processing agent in the feed line, in that the connector is brought into connection with a region of greatly reduced pressure, in other words a vacuum chamber. This causes a partial vacuum in the annular chamber, so that the tubing section inflates inside the annular chamber, thereby taking up portions of the flowing liquid. This can be utilized to withdraw portions of the liquid from the downstream region of the feed line when the pump which produces the liquid flow is shut off, in order to prevent the liquid from running out, for example, or from being mixed with other liquids.

Specifically, if the feed of processing agent is shut off at the application device, and, at the same time, the connector of the annular chamber is connected with the vacuum chamber, the tubing section is drawn into the annular chamber, thereby increasing volume, and draws the processing agent located in the feed channels and in the slit back from the slit, so that application to the web can immediately be stopped completely.

In a preferred embodiment, the radial flanges, together with the inside circumference of the tubular segment, delimit an essentially rectangular cross-section of the annular chamber, which is actually open towards the axis of the conduit and is closed off by the tubing section. When a partial vacuum is applied, the tubing section deforms radially outward, into the annular chamber.

It is practical if the ends of the tubing section are connected with the radial flanges by means of clamp rings. The clamp rings can be structured as cone rings. It is practical if the cone ring, in each instance, is braced on the tubular segment with axial draw spindles, together with the radial flanges, where clamping the ends of the tubing section can take place by way of interacting cone surfaces.

At least one back-off valve and one flush valve can be provided in the application device.

BRIEF DESCRIPTION OF THE DRAWINGS

The drawing shows exemplary embodiments of the invention.

FIG. 6 shows a flow chart of the system according to FIG. 5, at a so-called back-off.

DETAILED DESCRIPTION

Figure 1:
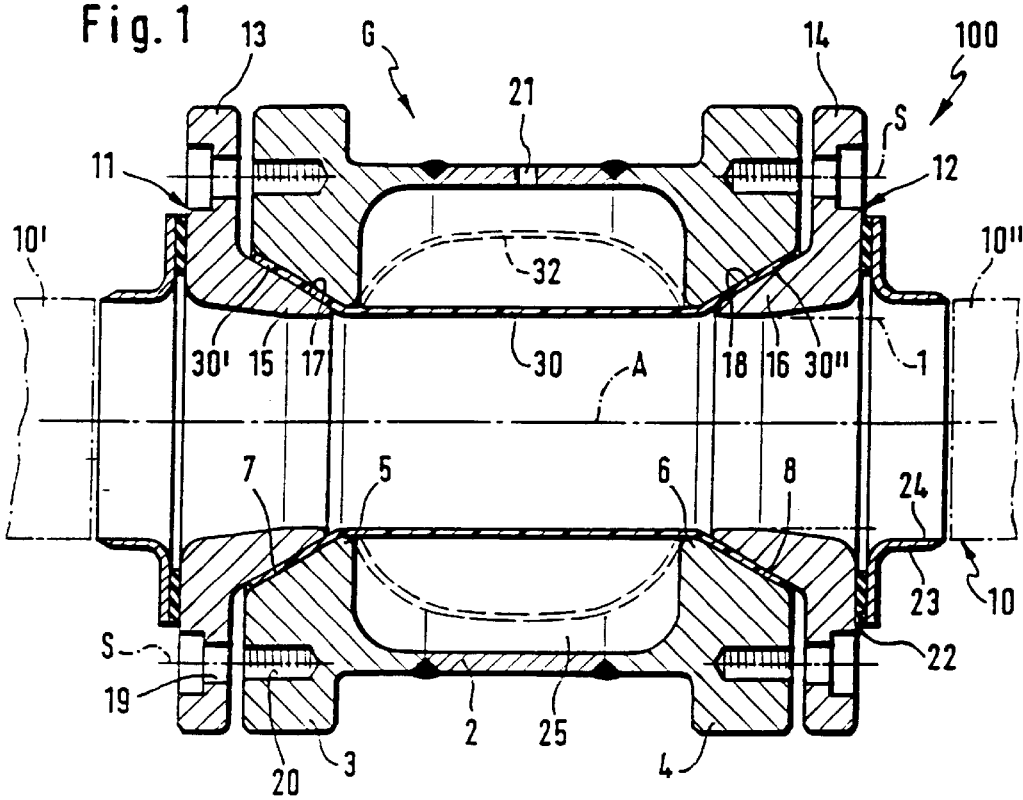
FIGS. 1 and 2 show lengthwise cross-sections through the axis of two structurally different embodiments of the tubular element according to the invention.
Figure 5:
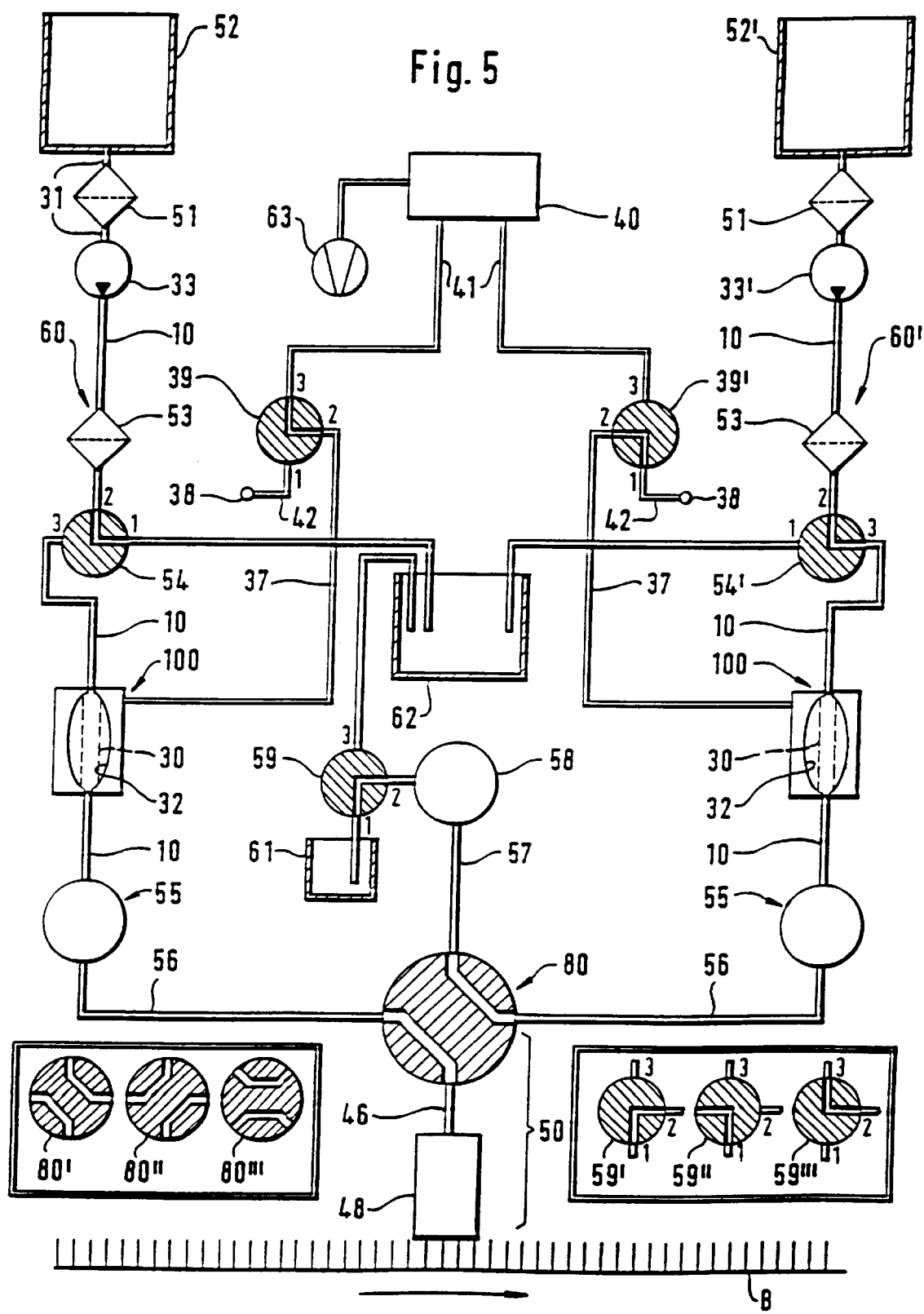
FIGS. 5 shows a diagram of a dyeing or patterning system provided with the tubular element, for rapid color changes.

The tubular element designated as a whole as 100 in FIG. 1 is inserted into a conduit which forms a feed line 10 to an application head 48 for a fluid processing agent (FIG. 5). Ends 10', 10" have the same diameter and lie opposite one another in alignment, i.e. on the same axis A, at a distance that corresponds to the length of tubular element 100 in the direction of axis A. The inside circumference of conduit 10 is continued, between ends 10', 10", by an imaginary cylindrical surface 1, which has essentially the same diameter as conduit 10.

Cylindrical surface 1 is surrounded, at a radial distance, by a housing 6, which includes a tubular segment 2 that is coaxial to axis A. Tubular segment 2 has radial flanges 3, 4 welded onto its ends. Radial flanges 3, form projections 5, 6 on the circumference that reach inside, close to imaginary cylindrical surface 1. Inside circumference surfaces 7, 8 of radial flanges 3, 4 are structured conically in such a way that the cone surfaces become narrower axially towards the inside. In the exemplary embodiment, the cone angle is about 30°.

At both ends of tubular element 100, cone rings 11, 12 are provided. Cone rings 11, 12 are coaxial to axis A and have an angular configuration, in lengthwise cross-section through axis A. Cone rings 11, 12 have a radial shank 13, 14 and an axial shank 15, 16, which projects axially from the former towards the center, and whose inside circumference lies essentially within the region of imaginary cylindrical surface 1, in each instance. The outside circumference of axial shanks 15, 16 is formed by a cone surface 17, 18, in each instance, which has the same cone angle as cone surfaces 7, 8, and is located radially right within the latter.

On the outside faces of cone rings 11, 12, connector nozzles 23 are affixed via seals 22; their inside circumference surface 24 essentially lies in imaginary cylindrical surface 1, and serves to make a connection with ends 10', 10" of feed line 10, either by being welded on, or in some other known manner.

Radial shank 13, 14 extends in front of the face of radial flange 3, 4, in each instance. In this region, axial draw spindles S, distributed over the circumference, are provided; they are indicated only by their center lines in FIG. 1 and pass through bores 19 in radial shanks 13, 14 and engage with threaded bores 20 in radial flanges 3, 4.

A tubing section 30 made of a material with an elastically flexible surface, such as an elastomer plastic or rubber, extends between inside circumference projections 5, 6; its ends 30', 30" engage between cone surface pairs 7, 17 and 8, 18, respectively, and are clamped between the latter when the draw spindles are tightened. Tubing section 30 is cylindrical in the force-free state, and extends essentially in the region of cylindrical surface 1.

In other words, an annular chamber 25 is formed between radial flanges 3, 4, which is delimited radially towards the inside by tubing section 30, radially towards the outside by the inside circumference of tubular element 2, and axially by flanges 3, 4, and has a connector 21, by which the interior of annular chamber 25 can be connected with zones at different pressure.

If essentially the same pressure is maintained in annular chamber 25 as in feed line 10, tubing section 30 remains in the cylindrical state shown with solid lines in FIG. 1, and serves as a damping element for pressure surges that occur in feed line 10. If, however, annular chamber 25 is connected, at connector 21, with a region of partial vacuum, i.e. vacuum chamber, tubing section 30 will inflate into annular chamber 25, because of its elasticity, as shown with broken lines in FIG. 1. This results in a larger volume inside tubing section 30, into which liquid is drawn from feed line 10. In this way, liquid can be retracted from an exit location, for example, in a manner which will be described in greater detail in connection with FIG. 4.

Figure 2:
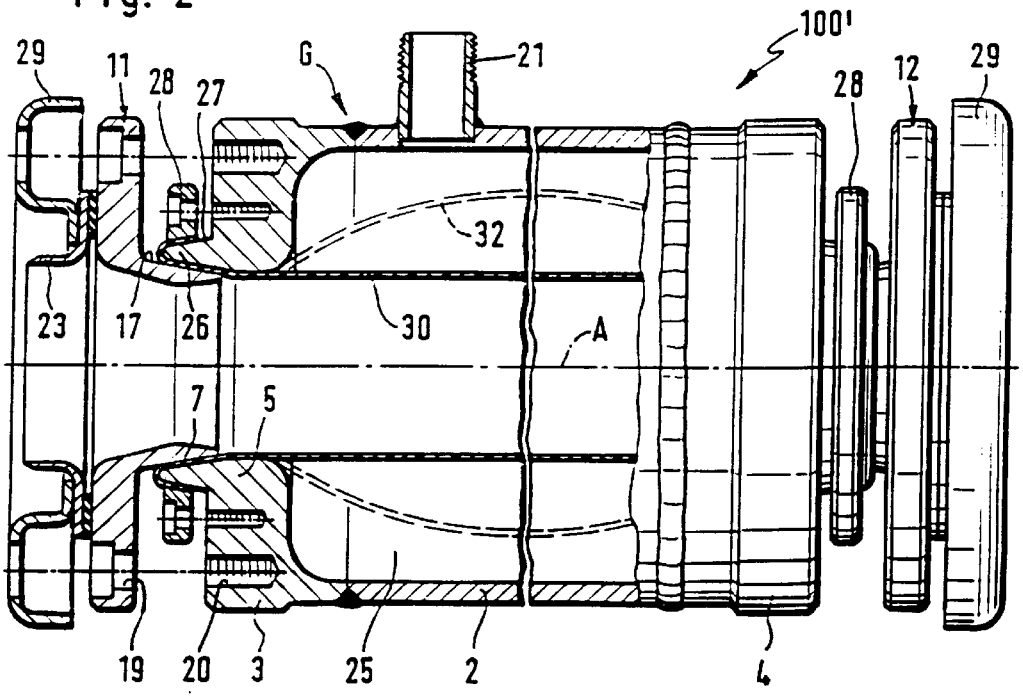

It is further evident from FIG. 1 that because of its structure as described, no noteworthy radial gaps or other dead spaces are present within tubular element 100, in which noticeable amounts of liquid could remain behind when the liquid is changed. Rather, feed line 10 is smoothly continued by tubular element 100. Emptying can take place just as completely as in the case of a smooth, continuous pipe.

Where tubular element 100' of FIG. 2 has functionally equivalent parts, these will be indicated with the same reference numbers.

One difference as compared with tubular element 100 is that radial flange 3, 4 has an axial projection 26 that points outward, with a conical outside circumference surface 27. A cone ring 28 is seated on the outside circumference surface 27, and clamps the outer edge of the tubing section in place, which edge is flipped back around axial projection 26.

Another difference is the presence of an axially outside retainer ring 29, which rests against connector bushing 23 from the outside.

Figure 3:
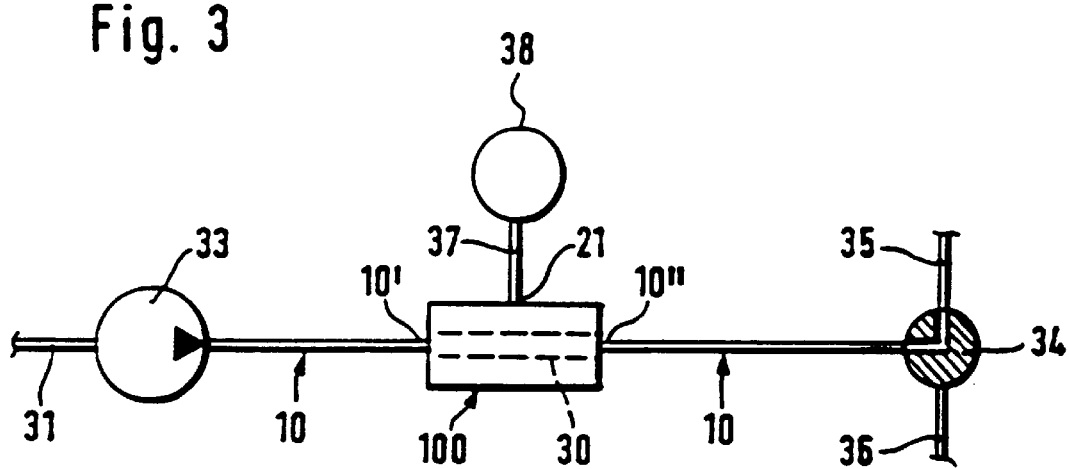
FIGS. 3 and 4 show schematic diagrams of two methods of use of the tubular element.

FIG. 3 schematically indicates an application example of tubular element 100. A pump 33 draws processing fluid in from a supply, via line 31, and transports the fluid into feed line. End 10' of feed line 10 is connected with tubular element 100, on the left side of FIG. 3. On the right side, tubular element 100 is connected with end 10" of feed line 10. Feed line 10 continues on to a valve 34, which optionally connects feed line 10 with line 35 or line 36. A region 38 filled with compressed air, indicated only by a circle, is connected at connector 21 of annular chamber 25 via a line 37; in this region, a regulated pressure prevails, corresponding to the pressure in feed line 10.

If pump 33 produces a pressure surge, for some reason, or if a pressure surge occurs from the other side when valve 34 is switched over, elastically flexible tubing section 30, which takes the cylindrical shape shown with solid lines in FIG. 1 and 2 and with broken lines in FIG. 3, can inflate somewhat radially to the outside, causing the pressure to remain essentially unchanged. This means that the pressure surges are flexibly absorbed and damped.

Figure 4:
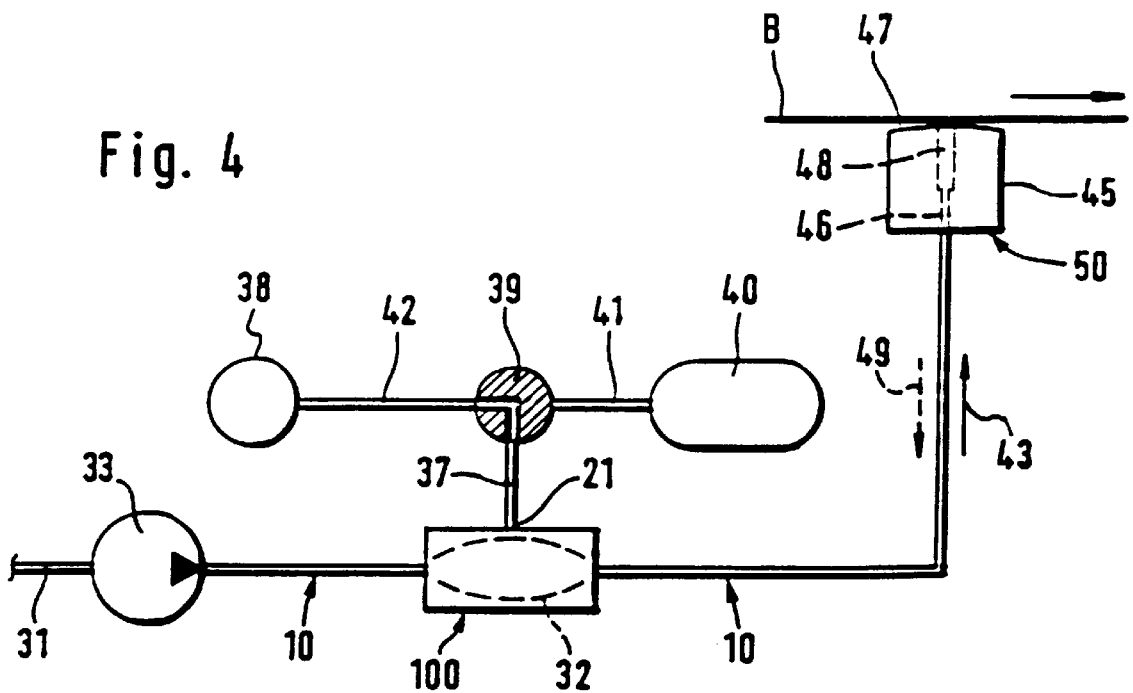

In FIG. 4, a dyeing device is indicated, in which pump 33 draws in a dye bath from a supply, not shown, via line 31, and transports it into line 10. Line 10 is connected with tubular element 100 on one side and leads away from it on the other side. At connector 21, there is a switch-over valve 39 above shunt line 37, which can optionally connect shunt line 37 with region 38, in which regulated pressure prevails, via line 42, or with a vacuum chamber 40, via line 41, which chamber is constantly being evacuated by a vacuum pump.

Line 10 transports the dye bath in the direction of the arrow, to an application head 50 with a housing 45 that extends crosswise over the width of the web. At least one feed channel 46 is formed in the housing, with feed line 10 opening into it. Feed channel 46, in turn, leads into a exit slit 48, which extends crosswise across the width of the web. Exit slit 48 opens into a slide surface 47, across which web B is transported in the direction of the arrow.

In the normal operational state, in which the web is to be continuously dyed, dye bath is transported to application head 50 in the direction of arrow 43, and pressed out of exit slit 48 against web B, thereby being applied to web B. Here, tubing section 30 has the cylindrical shape indicated in FIG. 3.

If dyeing is now supposed to be abruptly terminated, pump 33 is shut off and, at the same time, valve 39 is switched over in such a way that shunt line 37 is connected with vacuum chamber 40 via line 41. This causes the pressure in annular chamber 25 to drop suddenly to the pressure in vacuum chamber 40, thereby causing elastically flexible tubing section 30 to inflate to position 32, shown with broken lines, so that its internal volume increases. The liquid required to fill tubing section 30 in its shape 32 is drawn in from feed line 10, which is closed off by pump 33 on the left side, causing the liquid to be drawn in primarily from the right part of the feed line in FIG. 4. Dye bath located in exit slit 48 is therefore withdrawn in the direction of arrow 49, shown with broken lines, so that discharge of dye bath at the exit opening of exit slit 48 is suddenly interrupted. Depending on whether valve 39 produces a connection with region 38, in which regulated pressure prevails, or with region 40, in which partial vacuum prevails, tubular element 100 can act as a damping element or to empty the slit.

FIG. 5 shows another application example for the tubular element according to the invention in greater detail. This is a device for applying a patterning agent to a web, which is preferably used to dye carpets. The particular characteristic of the carpet dyeing system is the presence of two dye feed segments, where a quick change from the color of the one dye feed segment to the other is possible, using a dye change-over valve. A plurality of dye change-over valves is provided; these are arranged directly next to one another over the width of the web, and can be activated jointly or separately, so that patterning of the carpet web is also possible with the system.

The details of the dye change-over valve and the elements that interact with it are the object of German Patent Application 197 05 258.4-26; its disclosure content is referred to in this regard.

The two dye feed segments are indicated as a whole as 60 and 60', respectively, in FIG. 5. The two dye feed seaments 60 and 60' are connected with dye change-over valves 80, many of which are arranged next to one another, as was already explained. Each of these dye change-over valves 80 has the three operating positions 80', 80", and 80'", shown at the bottom left of FIG. 5. Dye change-over valve 80, in each instance, conducts the dye bath taken from dye feed segments 60 or 60' via line 10 to exit slit 48, which opens against the pile of a web B of carpet material that is constantly conveyed past it in the direction of the arrow.

From every dye change-over valve 80, there is a feed channel 46 that leads into exit slit 48, which is continuous over the width of web B and is common to all feed channels 46. The amounts of dye bath exiting from individual feed channels 46 mix only slightly at the edges, in exit slit 48. The width of the region of web B supplied by an individual dye change-over valve 80 can be 20 to 60 mm, where divisions of 25 and 50 mm, respectively, are preferred. At a width of 5 m for carpet web B, and a division of 25 mm, this means that there are two hundred dye change-over valves 80 located next to one another.

Where functionally equivalent parts occur in the two dye feed segments 60, 60', on the one hand, and in them and the diagrams of FIGS. 3, 4, and 6, the same reference numbers are used.

In dye feed segment 60, pump 33 draws in dye bath of a first type, for example red, via a line 31, in which a filter 51 is arranged, and transports it into a feed line 10, in which another filter 53 and a so-called back-off valve 54 follow. Feed line 10 then opens into a tubular element 100 of the type already described in connection with FIGS. 1 to 4. After passing through tubular element 100, the dye bath goes through feed line 10 to a distributor 55, in which it is divided up into a number of shunt lines 56 corresponding to the number of dye change-over valves 80. The individual shunt lines 56 each open into a dye change-over valve 80 assigned to them.

As is evident from FIG. 5, dye feed segment 60' includes the same elements, indicated with the same reference numbers, but to differentiate them from dye feed segment 60, some of them are marked with a prime symbol. Supply container 52' contains a different dye bath, e.g. blue.

In the situation shown in FIG. 5, in which the individual dye change-over valve 80 shown here is in position 80', and back-off valve 54 is in position 1-2 as drawn (connectors 1 and 2 connected), the red dye bath being transported by pump 33 is passed into collector tank 62 and no dye bath is being applied to web B out of exit slit 48.

To avoid start-up procedures, dye feed line 60 can also run at the same time while red is being applied to web B, but as is evident from FIG. 5, in the state shown in FIG. 5, the blue dye bath is transported via line 57 to a collector 58, which is followed by a so-called flush valve 59, from which the dye bath can be optionally discharged either into sewer system 61 or into a collector tank 62, the contents of which can be reused later. Flush valve 59 also has three positions, which are indicated at the bottom right of FIG. 5. Position 59' corresponds to the operating position shown in FIG. 5, in which the blue dye bath is being discharged from supply container 52' into sewer system 61. In position 59", there is no connection to collector 58. In position 59'", the dye bath is transported from collector 58 into collector tank 62.

When dye change-over valve 80 is switched over to position 80", the blue dye bath is applied to web B and the red dye bath gets into collector 58.

In position 80'", all the connections are closed.

A partial vacuum chamber 40 in the form of a vacuum container is provided, which is constantly held at a low pressure by a vacuum pump 63. Vacuum chamber 40 is connected, via lines 41, with two control valves 39, 39'. Control valves 39, 39' are assigned to one of dye feed segments 60 and 60', respectively, and optionally connect lines 41 with the region 38 in which regulated pressure prevails, via line 42, or with annular chamber 25 of tubular element 100, via line 37.

The particular characteristic of the system according to FIG. 5 is the capacity for a quick color change. The capacity for quick color change is particularly promoted by the fact that the individual dye change-over valves 80 are so close to exit slit 48. For this purpose, they are arranged in a common application head 50.

To demonstrate a rapid color change, the switching sequence of the various valves when carrying out a so-called "back-off" is shown in FIG. 6. A "back-off" is the process of dyeing a short pattern length in a different color, in the meantime, while dyeing in a first color takes place. In other words, the web advances continuously and is dyed with the first color. Then a switch to a different color takes place, and subsequently dyeing with the first color continues. The short pattern length serves to check how dyeing in the different color turns out, while continuing to dye in the first color, in order to be able to influence the dye bath batch of the other color, if necessary, without having any shut-down times.

For this purpose, it is assumed that all dye change-over valves 80 are switched over simultaneously from one dye bath to the other, thus there is a change from one solid-shade dyeing to the next, without patterning due to different actuation of adjacent dye change-over vales 80.

In FIG. 6, the time scale is shown in seconds at the top. Underneath that, the switching positions of the individual elements are shown, indicated with the reference numbers of FIG. 5.

At first, dye change-over valves 80 are in position 80', in which the dye bath from supply container 51, i.e. red, is being applied to web B, as indicated by black stripe 64 at letter "B". Here, back-off valve 54 is in position 2-3, differing from FIG. 5, so that the red dye bath can get to dye change-over valves 80.

If a color back-off to blue is supposed to take place, dye pump 33' for blue of dye feed segment 60' is turn on a few seconds ahead of time at position 65; because back-off valve 54' is in position 1-2 at first, differing from FIG. 5, its transport amount is passed into collector tank 62.

At position 66, back-off valve 54' is switched over, so that the blue dye bath no longer goes into collector tank 62, but rather into sewer system 61, at position 80' of dye change-over valve 80. At the same time, back-off valve 54, at which connectors 2 and 3 were connected, at first, so that red dye bath could get into application slit 48, is switched to position 2-1, in which the red dye bath is passed into collector tank 62. Furthermore, at the same time, at position 66, control valve 39 is switched over to position 2-3, in which tubular element 100 is connected with vacuum chamber 40, so that tubing section 30 is inflated into position 32 and retracts the red dye bath located in exit slit 48, feed channels 46, dye change-over valves 80, and in lines 56, somewhat, so that suddenly no red dye bath gets onto web B from exit slit 48 any longer, for all practical purposes. Starting from position 66, web B therefore stays white for a short time, as indicated by 67.

At position 68, dye change-over valves 80 switch over to position 80", so that blue dye bath is transported into exit slit 48, which mixes with the red dye bath in dye change-over valves 80, feed channels 46, and exit slit 48 for a short period of time, so that a mixed color is produced on web B, as indicated by cross-hatched region 69. At position 70, dye change-over valves 80, which have now been cleaned of red, are switched back to red, but do not receive any red dye bath, because back-off valve 54 remains in position 2-1, so that the red dye bath is being transported into collector tank 62, ahead of dye change-over valves 80. In other words, nothing is applied to web B, as indicated by white field 71.

At position 72, dye change-over valves 80 are switched to position 80' for blue, control valve 39' is switched to position 2–1 for collector tank 62, and back-off valve 54 is switched to position 2–3, all at the same time. The red dye bath therefore gets into collector 58, while pure blue dye bath is now being applied to web B, as indicated by hatched field 73. After all, the residues of red remaining in dye change-over valves 80, feed channels 46, and exit slit 48 were all flushed out in phase 69. The length of segment 73 is selected as needed, in order to be able to carry out the necessary color determinations or color measurements. Subsequently, the corresponding steps take place in reverse in region 75, so that dyeing with red 76 is continued again at position 74.

It should be noted that only 1.2 seconds elapse from position 66 to position 72. This corresponds to the time period for switching over to another color. Analogously, the time for passing through segment 75 is also 1.2 seconds. At an advancing speed of web B of 15 m/min, the transition time of 1.2 seconds means a length of only 30 cm on which a transition from one color to another can take place, without mixed shades occurring at the beginning of the new color. The example shown in FIG. 6 relates to a back-off in which a return to red dye 76 took place again after a switch to blue dye 73. It is understood that for a simple color change, the switching status of the components reached at position 72 would simply be maintained, so that the entire subsequent web length is dyed red, like sample piece 73.

The presence of tubular elements 100, which can be used to prevent excess dye from exiting from exit slit 48 and allow sudden stopping of the dye application, is important to achieve a transition-free color change.

What is claimed is:

1. A device for applying a fluid for applying a fluid processing agent to a web comprising:

an application head for applying the fluid to the web;

means for transporting the web past the application head;

a feed line for supplying the fluid processing agent to the application head, the feed line having an inner diameter;

a pressure accumulator arranged in the fluid feed line; the pressure accumulator comprising:

a tubular housing the housing forming an annular chamber with an inner diameter, the inner diameter of the annular chamber being larger than the inner diameter of the feed line;

an elastic sleeve, the diameter of the elastic sleeve being substantially the same as the inner diameter of the feed line, the elastic sleeve sealingly fastened to the housing to form a fluid passageway and separate the passageway from the annular chamber;

a control valve in fluid communication with the annular chamber, a vacuum source and a pressure source, wherein the control valve selectively applies either a vacuum or pressure to the annular chamber.

2. The device according to claim 1;

wherein the housing includes a tubular segment with radial flanges at the ends and the elastic sleeve is clamped over the radial flanges to form the annular chamber.

3. The device according to claim 2 further comprising:

clamp rings that interact with the radial flanges, the clamp rings clamping the ends of the elastic sleeve in place.

4. The device according to claim 3, wherein the clamp rings have a radial shank and an axial shank, the axial shank cooperating with the radial flanges to clamp the ends of the elastic sleeve in place.

5. The device according to claim 1, further comprising;

a shut-off valve arranged in the feed line; the shut-off valve connected to a collector tank, the shut-off valve connected to a sewer system, wherein the shut-off valve selectively diverts flow from the feed line to either the application head, the collector tank, or the sewer system.

6. The device according to claim 5 further comprising:

a flush valve; the flush valve selectively connecting the application head to either the sewer system or the collector tank.

* * * * *

UNITED STATES PATENT AND TRADEMARK OFFICE
CERTIFICATE OF CORRECTION

PATENT NO.      : 6,305,421 B1                                           Page 1 of 1
DATED           : October 23, 2001
INVENTOR(S)     : Karl-Heinz Ahrweiler It is certified that error appears in the above-identified patent and that said Letters Patent is hereby corrected as shown below:

<u>Title page,</u>
Item [22], change "Filed" to -- PCT Filed: May 13, 1998 --;

On the line after Item [22], please insert the following information:
-- [86]  PCT No.:          PCT/DE98/01329
         § 371 Date:       April 24, 2000
         § 102(e) Date:    April 24, 2000
   [87]  PCT Pub. No.:     WO98/55794
         PCT Pub. Date:    December 10, 1998 --;

After "*Primary Examiner*" please insert -- [74] *Attorney, Agent, or Firm* - Kenyon & Kenyon --;

<u>Column 5,</u>
Line 24, change "seaments" to -- segments --.

Signed and Sealed this

Twenty-seventh Day of August, 2002

Attest:

Attesting Officer

JAMES E. ROGAN
*Director of the United States Patent and Trademark Office*